L. D. MORTON

PACKING CASE.

APPLICATION FILED MAY 2, 1910.

Reissued Sept. 3, 1912.

13,465.

Witnesses
W. E. Ford
O. F. Belknap

Inventor
Lawrence D. Morton
By Whittemore, Hulbert & Whittemore
Attys

UNITED STATES PATENT OFFICE.

LAWRENCE D. MORTON, OF SANDUSKY, OHIO, ASSIGNOR TO THE HINDE & DAUCH PAPER COMPANY, OF SANDUSKY, OHIO, A CORPORATION OF OHIO.

PACKING-CASE.

13,465. Specification of Reissued Letters Patent. Reissued Sept. 3, 1912.

Original No. 905,449, dated December 1, 1908, Serial No. 379,148. Application for reissue filed May 2, 1910. Serial No. 559,041.

*To all whom it may concern:*

Be it known that I, LAWRENCE D. MORTON, a citizen of the United States of America, and a resident of the city of Sandusky, in the county of Erie and State of Ohio, have invented certain new and useful Improvements in Packing-Cases, of which the following is a specification, reference being had therein to the accompanying drawings.

The invention relates particularly to a combined packing and shipping case for fragile articles, especially designed in this instance for lamp shades, and it consists in the novel construction of the case and in the peculiar arrangement and combination of its parts.

Figure 1:
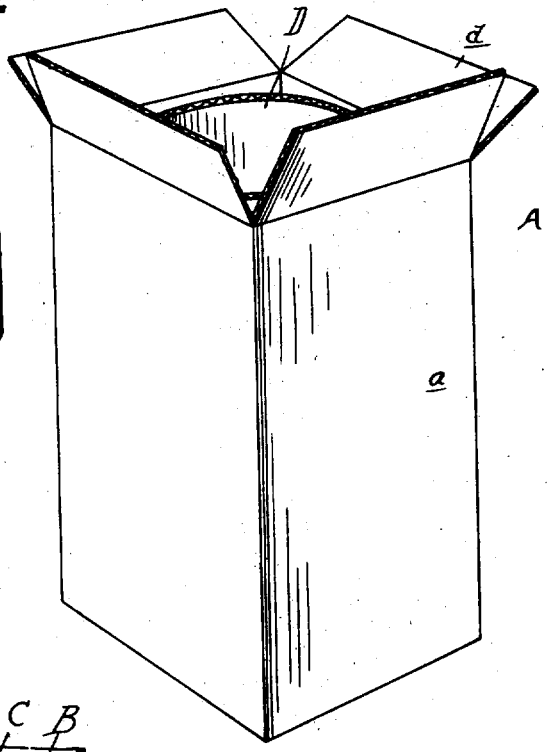
Figure 3:
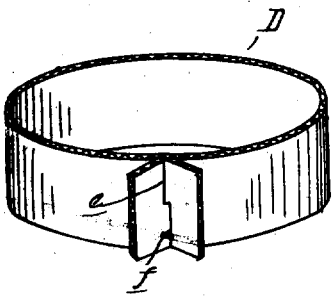
Figure 4:
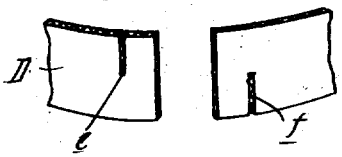
Figure 2:
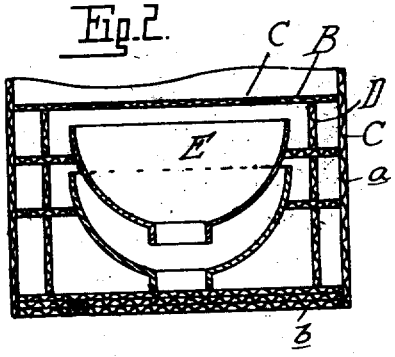
Figure 5:
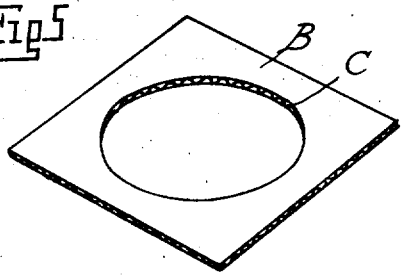

In the drawings,—Figure 1 is a perspective view of the case; Fig. 2 is a vertical central section therethrough; Fig. 3 is a perspective view of one of the spacing members; Fig. 4 is a perspective view of the end portion of the spacing member, illustrating the manner of engaging the ends; and Fig. 5 is a perspective view of one of the article-supporting members.

The case is formed preferably of pulp board,—such as double-faced corrugated paper,—which is less expensive and more satisfactory than the ordinary wooden box in that it is adapted to yield or give in use, thus producing an elastic retainer for the article.

The construction comprises a casing proper A of elongated form, as shown in Fig. 1, formed of sides *a*, a bottom *b*, reinforced by a plurality of layers, as *c*, and flaps *d* adapted to be folded over one upon another to close the open end of the casing.

Arranged within the case described longitudinally thereof is a series of transverse article-supporting members B, extending in parallel alinement, as shown in Fig. 2, each apertured centrally, as at C, to form a seat for the article. Each of these members is proportioned to contact with the sides of the casing proper, to be held in its proper position therein, and is also preferably formed of pulp board to form a yielding support.

Interposed between the several transverse members described and acting to space the same one from another is a longitudinally extending series of cylindrical spacing members D, the opening of each cylinder being considerably greater than the adjoining apertures in the transverse members to permit of the spacer having the proper bearing upon the article-supporting members and to be free from the suspended article. Also, for the purpose of strengthening the case, these spacing cylinders are arranged in axial alinement, as shown in Fig. 2, the entire series resting upon the casing bottom.

In construction, the spacing devices are formed each preferably of a single strip of corrugated board such as described bent into circular form, and the ends interlocking as shown in Fig. 3, the end portions being scored, as at *e* and *f* to permit of the locking engagement.

In filling the box or case, one of the cylindrical spacing members is placed upon the case bottom and the transverse apertured member supported thereon. A lamp shade E is then inserted within the opening in the transverse member, and these several steps are repeated until the case is filled.

It will be observed from the construction and the arrangement of the parts that each shade is entirely independent of the others, and is held in a state of suspension out of contact with the casing proper, so that the liability of breakage is reduced to a minimum.

What I claim as my invention is,—

1. A packing case, comprising an inclosing casing, a series of separated transverse members arranged in parallel alinement independent of and extending longitudinally within the casing, each member being apertured to form a retaining seat for the article and the apertures registering, and a corresponding series of open-ended tubular spacing members also independent of the casing arranged intermediate of the apertured members, the cylinder openings respectively exceeding in area the apertures in the transverse members, the end member of the series forming a support for the several transverse members and the articles carried thereby.

2. A packing and shipping case, comprising an inclosing casing, a single series of separated centrally-apertured plate members therein, each independent of and extending transversely of the casing, and the series longitudinally thereof in parallel alinement, and an axially-alined series of spacing cylinders also independent of the casing arranged each intermediate adjoining plate members, the cylinder openings being respectively of greater area than the plate apertures, the end member of the series forming a support for the transverse members and the articles carried thereby.

3. A packing case, formed of pulp board consisting of an elongated casing proper, comprising sides, a closed reinforced bottom and flaps closing the casing top, a single series of flat centrally-apertured plates independent of and extending longitudinally within the casing in parallel alinement, and a corresponding series of annular spacing members for the plates also independent of the casing arranged intermediate of the latter and in axial alinement with the plate apertures.

4. A packing case, comprising an inclosing casing, a single series of centrally apertured plate members therein, each independent of and extending transversely of the casing, and the series longitudinally thereof in parallel alinement, and an alining series of spacing cylinders also independent of the casing formed each of a single strip of material bent into circular form, and the ends detachably connected, the cylinders being arranged each intermediate adjoining plate members, for the purpose described.

5. A packing case formed of pulp board, consisting of an elongated casing comprising sides, a closed reinforced bottom and flaps closing the casing top, a series of separated transverse members arranged in parallel alinement independent of and extending longitudinally within the casing, each member being apertured to form a retaining seat for the article and the apertures registering, and a corresponding series of open-ended tubular spacing members also independent of the casing arranged intermediate of the apertured members, the cylinder openings respectively exceeding in area the apertures in the transverse members.

6. A packing case, consisting of an elongated casing proper comprising sides, a closed reinforced bottom and flaps closing the casing top, a single series of centrally apertured plate members within the casing, each being independent and extending transversely of the casing and the series longitudinally thereof in parallel alinement, and an alining series of spacing cylinders also independent of the casing formed each of a single strip of material bent into circular form and the ends detachably connected, the cylinders being arranged each intermediate adjoining plate members.

7. The combination with a case for the reception of a nested series of articles, of means within said case for supporting said articles in their nested relation and in all positions out of stress-transmitting connection with each other.

8. The combination with a case for the reception of a nested series of articles, of a series of individual supports for said articles in their nested relation within said case adapted in all positions to hold the adjacent articles from stress-transmitting contact.

9. The combination with a case for the reception of a nested series of articles, of a series of transversely extending members fitting within said case and apertured to form seats for the respective articles of the series while in their nested relation, and means for spacing said transverse members to hold the adjacent articles of the series in all positions out of stress-transmitting contact.

In testimony wheref I hereby affixed my signature in the presence of two witnesses.

LAWRENCE D. MORTON.

In presence of—
SIDNEY FROHMAN,
J. J. DAUCH.